US012102127B2

(12) United States Patent
Park et al.

(10) Patent No.: US 12,102,127 B2
(45) Date of Patent: Oct. 1, 2024

(54) AEROSOL GENERATING DEVICE WITH MULTIPLE HEATING PORTIONS

(71) Applicant: KT&G CORPORATION, Daejeon (KR)

(72) Inventors: In Su Park, Seoul (KR); Eun Mi Jeoung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 632 days.

(21) Appl. No.: 17/420,277

(22) PCT Filed: Mar. 19, 2021

(86) PCT No.: PCT/KR2021/003415
§ 371 (c)(1),
(2) Date: Jul. 1, 2021

(87) PCT Pub. No.: WO2021/215673
PCT Pub. Date: Oct. 28, 2021

(65) Prior Publication Data

US 2023/0189890 A1 Jun. 22, 2023

(30) Foreign Application Priority Data

Apr. 22, 2020 (KR) ........................ 10-2020-0048862

(51) Int. Cl.
*A24F 40/465* (2020.01)
*A24F 40/20* (2020.01)
*H05B 6/10* (2006.01)

(52) U.S. Cl.
CPC ............ *A24F 40/465* (2020.01); *A24F 40/20* (2020.01); *H05B 6/105* (2013.01)

(58) Field of Classification Search
CPC ........ A24F 40/20; A24F 40/46; A24F 40/465; A24F 40/57; H05B 6/105
See application file for complete search history.

(56) References Cited

U.S. PATENT DOCUMENTS

| | | | |
|---|---|---|---|
| 9,516,899 | B2 | 12/2016 | Plojoux et al. |
| 11,457,664 | B2 | 10/2022 | Aoun et al. |

(Continued)

FOREIGN PATENT DOCUMENTS

| | | | |
|---|---|---|---|
| CN | 109315838 | A | 2/2019 |
| JP | 2015-506170 | A | 3/2015 |
| JP | 2019-134701 | A | 8/2019 |
| JP | 2019-522985 | A | 8/2019 |
| KR | 10-2014-0116055 | A | 10/2014 |

(Continued)

OTHER PUBLICATIONS

International Search Report dated Jul. 27, 2021 from the International Searching Authority in International Application No. PCT/KR2021/003415.

(Continued)

*Primary Examiner* — Oscar C Jimenez
(74) *Attorney, Agent, or Firm* — Sughrue Mion, PLLC

(57) ABSTRACT

An aerosol generating device includes an accommodation portion configured to accommodate at least a portion of a cigarette, and a heater arranged in the accommodation portion to heat the cigarette. The heater may include a first heating portion arranged along the inside of the accommodation portion, a second heating portion arranged in a lower portion of the accommodation portion, and a third heating portion extending in a lengthwise direction of the cigarette from the lower portion of the accommodation portion, and the first heating portion, the second heating portion, and the third heating portion may be thermally connected to one another.

13 Claims, 7 Drawing Sheets

(56) References Cited

U.S. PATENT DOCUMENTS

| | | | | |
|---|---|---|---|---|
| 2014/0305449 | A1 | 10/2014 | Plojoux et al. | |
| 2019/0230987 | A1 | 8/2019 | Wu et al. | |
| 2020/0229497 | A1 | 7/2020 | Aoun et al. | |
| 2020/0281273 | A1 | 9/2020 | Kim et al. | |
| 2020/0359688 | A1 | 11/2020 | Jang et al. | |
| 2020/0375256 | A1* | 12/2020 | Chong | A24F 40/51 |
| 2021/0251290 | A1* | 8/2021 | Van | A24F 40/46 |
| 2021/0259311 | A1* | 8/2021 | Van Lancker | A24F 40/46 |
| 2022/0022555 | A1* | 1/2022 | Desnerck | B33Y 30/00 |
| 2022/0046990 | A1* | 2/2022 | Reevell | A24F 40/50 |
| 2022/0046991 | A1* | 2/2022 | Zinovik | A24F 40/20 |
| 2023/0068343 | A1* | 3/2023 | Batista | A24F 40/44 |
| 2023/0141848 | A1* | 5/2023 | Yoon | A24F 40/48<br>131/329 |
| 2023/0292818 | A1* | 9/2023 | Kwon | A24D 3/17<br>131/329 |
| 2024/0032587 | A1* | 2/2024 | Kwon | A24F 40/46 |
| 2024/0041100 | A1* | 2/2024 | Park | H05B 6/108 |
| 2024/0049796 | A1* | 2/2024 | Moloney | H05B 6/108 |

FOREIGN PATENT DOCUMENTS

| | | | |
|---|---|---|---|
| KR | 10-2019-0012207 | A | 2/2019 |
| KR | 10-2019-0049390 | A | 5/2019 |
| KR | 10-2019-0093027 | A | 8/2019 |
| KR | 10-2019-0093147 | A | 8/2019 |
| KR | 10-2036030 | B1 | 10/2019 |
| KR | 10-2020-0027683 | A | 3/2020 |
| WO | 2018/002083 | A1 | 1/2018 |
| WO | 2019/030363 | A1 | 2/2019 |
| WO | 2019/234143 | A1 | 12/2019 |

OTHER PUBLICATIONS

Office Action issued Nov. 8, 2021 in Korean Application No. 10-2020-0048862.

Office Action dated Aug. 23, 2022 from the Japanese Patent Office in JP Application No. 2021-535507.

Extended European Search Report dated May 2, 2022 in European Application No. 21734041.3.

* cited by examiner

AEROSOL GENERATING DEVICE WITH MULTIPLE HEATING PORTIONS

CROSS REFERENCE TO RELATED APPLICATIONS

This application is a National Stage of International Application No. PCT/KR2021/003415 filed Mar. 19, 2021, claiming priority based on Korean Patent Application No. 10-2020-0048862 filed Apr. 22, 2020.

TECHNICAL FIELD

One or more embodiments of the present disclosure relate to an aerosol generating device, and more particularly to an aerosol generating device including a heater capable of heating the inside, outside, and one end portion of a cigarette.

BACKGROUND ART

Recently, the demand for alternative methods to overcome the disadvantages of traditional cigarettes has increased. For example, there is an increasing demand for a method of generating aerosols by heating an aerosol generating material in cigarettes, rather than by burning cigarettes. Accordingly, researches on a heating-type cigarette or a heating-type aerosol generating device have been actively conducted.

A heater that heats a cigarette may be largely divided into an internal-heating-type heater and an external-heating-type heater. The internal-heating-type heater uses a heater inserted into the cigarette to heat the inside of the cigarette so that heat moves from the inside of the cigarette to the outside of the cigarette, and the external-heating-type heater heats the outside of the cigarette so that heat moves from the outside of the cigarette to the inside of the cigarette.

DESCRIPTION OF EMBODIMENTS

Technical Problem

Among heaters of an aerosol generating device, an internal-heating-type heater in which a heater is inserted into a cigarette heats the inside of the cigarette to a high temperature. Therefore, there may be a problem in that a portion of the cigarette adjacent to the heater is carbonized due to the high temperature and off-flavor is caused, accordingly. On the other hand, an external-heating-type heater heats a large area. Therefore, there may be a problem in that a preheating time of the heater is long at the beginning of an operation of the aerosol generating device.

In order to deal with such limitations, one or more embodiments of the present disclosure provide an aerosol generating device capable of heating the cigarette by using a heater capable of heating the outside, inside and one end portion of the cigarette.

Technical problems to be solved by the embodiments are not limited to the above-described problems, and problems that are not mentioned will be clearly understood by those of ordinary skill in the art from the present disclosure and the accompanying drawings.

Solution to Problem

According to an embodiment of the present disclosure, an aerosol generating device includes an accommodation portion configured to accommodate at least a portion of a cigarette, and a heater arranged in the accommodation portion to heat the cigarette, wherein the heater may include a first heating portion arranged along the inside of the accommodation portion, a second heating portion arranged in a lower portion of the accommodation portion, and a third heating portion extending in a lengthwise direction of the cigarette from the lower portion of the accommodation portion, and the first heating portion, the second heating portion, and the third heating portion may be thermally connected to one another.

Advantageous Effects of Disclosure

The aerosol generating device according to one or more embodiments of the present disclosure includes a heater capable of heating the outside and inside of a cigarette, thereby shortening an initial preheating time of a heater required to heat the cigarette.

The aerosol generating device according to one or more embodiments of the present disclosure heats the outside, inside, and one end portion of the cigarette to provide a user with excellent smoking taste and an adequate amount of atomization, and cuts consumption of power required to heat the heater.

The effects according to one or more embodiments are not limited to the effects described above, and unmentioned effects will be clearly understood by one of ordinary skill in the art from the present specification and the accompanying drawings.

BEST MODE

Figure 1:
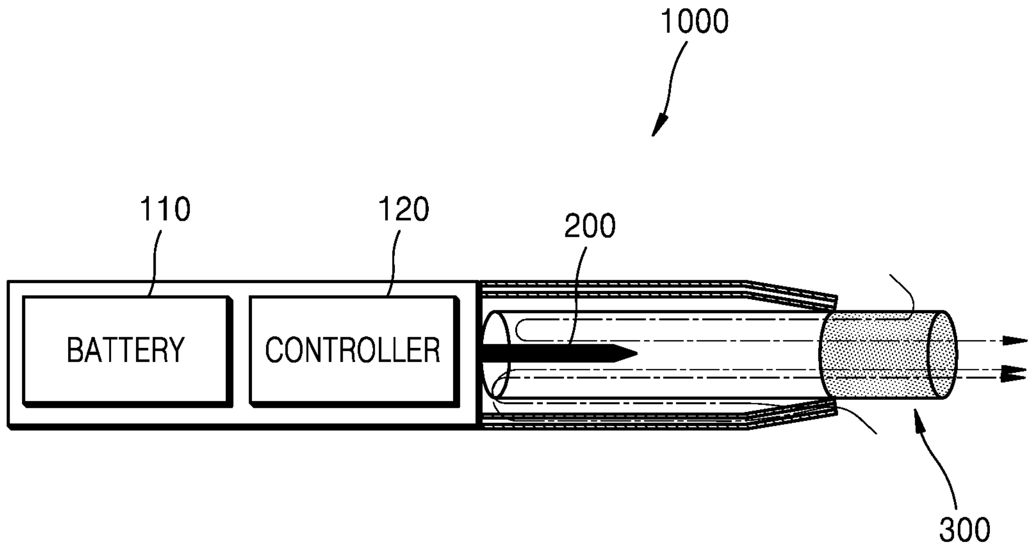
FIG. 1 is a diagram illustrating an example in which a cigarette is inserted into an aerosol generating device.

According to an embodiment of the present disclosure, an aerosol generating device includes an accommodation portion configured to accommodate at least a portion of a cigarette, and a heater arranged in the accommodation portion to heat the cigarette, wherein the heater may include a first heating portion arranged along the inside of the accommodation portion, a second heating portion arranged in a lower portion of the accommodation portion, and a third heating portion extending in a lengthwise direction of the cigarette from the lower portion of the accommodation portion, and the first heating portion, the second heating portion, and the third heating portion may be thermally connected to one another.

The first heating portion and the second heating portion may be arranged to contact each other, and the second heating portion and the third heating portion may be arranged to contact each other.

When the cigarette is inserted into the accommodation portion, the first heating portion may surround at least a portion of an outer surface of the cigarette to heat the outer surface of the cigarette, the second heating portion may contact one end portion of the cigarette to heat the one end portion of the cigarette, and the third heating portion may be inserted into the cigarette to heat the inside of the cigarette.

The first heating portion may be concavely curved toward the third heating portion.

The first heating portion may be heated to a first temperature, the second heating portion may be heated to a second temperature lower than or equal to the first temperature, and the third heating portion may be heated to a third temperature lower than or equal to the second temperature.

The first heating portion may include a material having a first thermal conductivity, the second heating portion may include a material having a second thermal conductivity lower than the first thermal conductivity, and the third heating portion may include a material having a third thermal conductivity lower than the second thermal conductivity.

The cigarette may include a medium portion including an aerosol generating material, and a length of the first heating portion may be 0.3 times to 1 time a length of the medium portion.

The heater may further include a fourth heating portion arranged in the accommodation portion to be thermally connected to the first heating portion, wherein the first heating portion may be heated by the fourth heating portion to transfer heat to the second heating portion, and the second heating portion may transfer heat to the third heating portion.

The fourth heating portion may cover at least a portion of an inner surface of the accommodation portion, and may be arranged apart from the first heating portion by a certain distance.

A length of the fourth heating portion may be 0.5 times to 1 time the length of the first heating portion.

The heater may further include an induction coil arranged outside the accommodation portion to generate an alternating magnetic field, wherein the first heating portion may receive the alternating magnetic field to generate heat, the second heating portion may receive heat from the first heating portion, and the third heating portion may receive heat from the second heating portion.

The heater may further include an induction coil arranged outside the accommodation portion to generate an alternating magnetic field, wherein the first heating portion and the third heating portion may receive the alternating magnetic field to generate heat, and the second heating portion may receive heat from the first heating portion and the third heating portion.

MODE OF DISCLOSURE

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word “comprise” and variations such as “comprises” or “comprising” will be understood to imply the inclusion of stated elements but not the exclusion of any other elements. In addition, the terms “-er”, “-or”, and “module” described in the specification mean units for processing at least one function and/or operation and can be implemented by hardware components or software components and combinations thereof.

As used herein, terms including an ordinal number such as “first” or “second” may be used to describe various components, but the components should not be limited by the terms. The terms are used for the purpose of distinguishing one component from other components.

Throughout the specification, a “longitudinal direction” of a component may refer to a direction in which the component extends along one direction axis of the component, and in that case one direction axis of the component may refer to a direction in which the component extends longer than the other direction axis crossing the one direction axis.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIG. 1 is a diagram illustrating an example in which a cigarette is inserted into an aerosol generating device.

Referring to FIG. 1, the aerosol generating device 1000 may include a battery 110, a controller 120, and a heater 200. Also, the cigarette 300 may be inserted into an inner space of the aerosol generating device 1000.

FIG. 1 illustrates components of the aerosol generating device 1000, which are related to the present embodiment. Therefore, it will be understood by one of ordinary skill in the art related to the present embodiment that other general-purpose components may be further included in the aerosol generating device 1000, in addition to the components illustrated in FIG. 1.

FIG. 1 illustrates that the battery 110, the controller 120, and the heater 200 are arranged in series, but the arrangement of these are not limited thereto. In other words, according to the design of the aerosol generating device 1000, the battery 110, the controller 120, and the heater 200 may be differently arranged.

When the cigarette 300 is inserted into the aerosol generating device 1000, the aerosol generating device 1000 heats the heater 200. The temperature of an aerosol generating material in the cigarette 300 is raised by the heated heater 200, and thus the aerosol is generated. The generated aerosol is delivered to a user through a filter rod 320 of the cigarette 300.

As necessary, even when the cigarette 300 is not inserted into the aerosol generating device 1000, the aerosol generating device 1000 may heat the heater 200.

The battery 110 may supply power to be used for the aerosol generating device 1000 to operate. For example, the battery 110 may supply power to heat the heater 200, and may supply power for operating the controller 120. Also, the battery 110 may supply power for operations of a display, a sensor, a motor, etc. mounted in the aerosol generating device 1000.

The controller 120 may generally control operations of the aerosol generating device 1000. In detail, the controller 120 may control not only operations of the battery 110 and the heater 200, but also operations of other components included in the aerosol generating device 1000. Also, the controller 120 may check a state of each of the components of the aerosol generating device 1000 to determine whether or not the aerosol generating device 1000 is able to operate.

The controller 120 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 200 is heated by power supplied from the battery 110. For example, when the cigarette is inserted into the aerosol generating device 1000, the heater 200 may be located within the cigarette. Therefore, the heated heater 200 may raise a temperature of an aerosol generating material within the cigarette.

The heater 13000 may include an electro-resistive heater. For example, the heater 200 may include an electrically conductive track, and the heater 200 may be heated when currents flow through the electrically conductive track. However, the heater 200 is not limited to the example described above and may include all heaters which may be heated to a desired temperature. Here, the desired temperature may be pre-set in the aerosol generating device 1000 or may be set by a user.

As another example, the heater 200 may include an induction heater. More specifically, the heater 200 may include an electrically conductive coil to heat the cigarette in an induction heating method, and the cigarette may include a susceptor capable of being heated by an induction-heating-type heater.

FIG. 1 illustrates that the heater 200 is inserted into the cigarette 300, but it is not limited thereto. For example, the heater 200 may include a tube-type heating element, a plate-type heating element, a needle-type heating element, or a rod-type heating element, and may heat the inside or the outside of the cigarette 300, according to the shape of the heating element.

Also, the aerosol generating device 1000 may include a plurality of heaters 200. Here, the plurality of heaters 200 may be inserted into the cigarette 300 or may be arranged outside the cigarette 300. Also, some of the plurality of heaters 200 may be inserted into the cigarette 300, and the others may be arranged outside the cigarette 300. In addition, the shape of the heater 200 is not limited to the shape illustrated in FIG. 1, and may include various shapes.

The aerosol generating device 1000 may further include general-purpose components in addition to the battery 110, the controller 120, and the heater 200. For example, the aerosol generating device 1000 may include a display capable of outputting visual information and/or a motor for outputting haptic information. Also, the aerosol generating device 1000 may include at least one sensor (a puff detecting sensor, a temperature detecting sensor, an cigarette insertion detecting sensor, etc.).

Also, the aerosol generating device 1000 may be formed as a structure that, even when the cigarette 300 is inserted into the aerosol generating device 1000, may introduce external air or discharge internal air.

Although not illustrated in FIG. 1, the aerosol generating device 1000 and an additional cradle may form together a system. For example, the cradle may be used to charge the battery 110 of the aerosol generating device 1000. Alternatively, the heater 200 may be heated when the cradle and the aerosol generating device 1000 are coupled to each other.

The cigarette 300 may be similar to a general combustive cigarette. For example, the cigarette 300 may be divided into a first portion including an aerosol generating material and a second portion including a filter or the like. Alternatively, the second portion of the cigarette 300 may also include an aerosol generating material. For example, an aerosol generating material made in the form of granules or capsules may be inserted into the second portion.

The first portion may be completely inserted into the aerosol generating device 1000, and the second portion may be exposed to the outside. Alternatively, only a portion of the first portion may be inserted into the aerosol generating device 1000, or a portion of the first portion and a portion of the second portion may be inserted thereinto. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 1000. For example, opening and closing of the air passage and/or a size of the air passage formed in the aerosol generating device 1000 may be adjusted by the user. Accordingly, the amount of smoke and a smoking impression may be adjusted by the user. As another example, the external air may flow into the cigarette 300 through at least one hole formed in a surface of the cigarette 300.

Hereinafter, an example of the cigarette 300 will be described with reference to FIG. 2.

Figure 2:
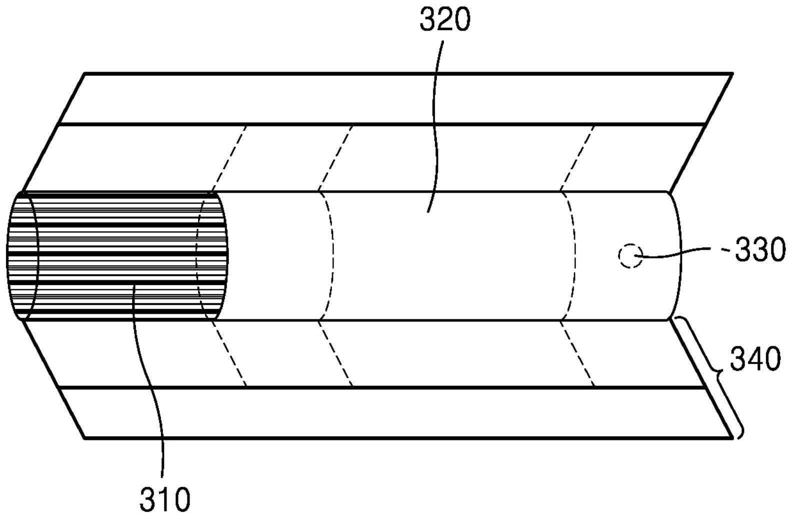
FIG. 2 shows a view showing an example of a cigarette.

FIG. 2 shows a view showing an example of a cigarette.

Referring to FIG. 2, the cigarette 300 includes a tobacco rod 310 and a filter rod 320. The first portion described above with reference to FIG. 1 includes the tobacco rod 310, and the second portion includes the filter rod 320.

FIG. 2 illustrates that the filter rod 320 includes a single segment, but is not limited thereto. In other words, the filter rod 320 may include a plurality of segments. For example, the filter rod 320 may include a first segment configured to cool an aerosol and a second segment configured to filter a certain component included in the aerosol. Also, as necessary, the filter rod 320 may further include at least one segment configured to perform other functions.

The cigarette 300 may be packaged by at least one wrapper 340. The wrapper 340 may have at least one hole through which external air may be introduced or internal air may be discharged. For example, the cigarette 300 may be packaged by one wrapper 340. As another example, the cigarette 300 may be doubly packaged by two or more wrappers 340. For example, the tobacco rod 310 may be packaged by a first wrapper, and the filter rod 320 may be packaged by a second wrapper. Also, the tobacco rod 310 and the filter rod 320, which are respectively packaged by separate wrappers, may be coupled to each other, and the entire cigarette 300 may be packaged by a third wrapper. When each of the tobacco rod 310 or the filter rod 320 is composed of a plurality of segments, each segment may be packaged by separate wrappers. Also, the entire cigarette 300 including the plurality of segments, which are respectively packaged by the separate wrappers and which are coupled to each other, may be re-packaged by another wrapper.

The tobacco rod 310 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 310 may include other additives, such as flavors, a wetting agent, and/or organic acid. Also, the tobacco rod 310 may include a flavored liquid, such as menthol or a moisturizer, which is injected to the tobacco rod 310.

The tobacco rod 310 may be manufactured in various forms. For example, the tobacco rod 310 may be formed as a sheet or a strand. Also, the tobacco rod 310 may be formed as a pipe tobacco, which is formed of tiny bits cut from a tobacco sheet. Also, the tobacco rod 310 may be surrounded by a heat conductive material. For example, the heat-conducting material may be, but is not limited to, a metal foil such as aluminum foil. For example, the heat conductive material surrounding the tobacco rod 310 may uniformly distribute heat transmitted to the tobacco rod 310, and thus, the heat conductivity applied to the tobacco rod may be increased and taste of the tobacco may be improved. Also, the heat conductive material surrounding the tobacco rod 310 may function as a susceptor heated by the induction heater. Here, although not illustrated in the drawings, the tobacco rod 310 may further include an additional susceptor, in addition to the heat conductive material surrounding the tobacco rod 310.

The filter rod 320 may include a cellulose acetate filter. Shapes of the filter rod 320 are not limited. For example, the filter rod 320 may include a cylinder-type rod or a tube-type rod having a hollow inside. Also, the filter rod 320 may include a recess-type rod. When the filter rod 320 includes a plurality of segments, at least one of the plurality of segments may have a different shape.

The filter rod 320 may be formed to generate flavors. For example, a flavoring liquid may be injected onto the filter rod 320, or an additional fiber coated with a flavoring liquid may be inserted into the filter rod 320.

Also, the filter rod 320 may include at least one capsule 330. Here, the capsule 330 may perform a function of generating a flavor or an aerosol. For example, the capsule 330 may have a configuration in which a liquid containing a flavoring material is wrapped with a film. For example, the capsule 330 may have a spherical or cylindrical shape, but is not limited thereto.

When the filter rod 320 includes a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above-described example and is not limited as long as the cooling segment cools the aerosol.

Figure 3:
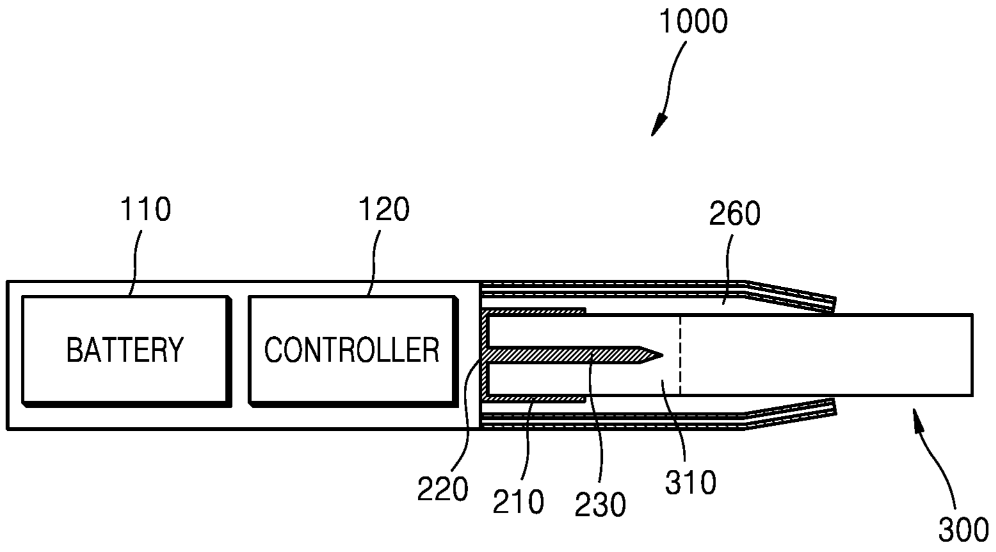
FIG. 3 is a schematic diagram illustrating an example in which a cigarette is inserted into an aerosol generating device, according to an embodiment.

FIG. 3 is a schematic diagram showing an example in which the cigarette 300 is inserted into the aerosol generating device 1000, according to an embodiment.

Referring to FIG. 3, the aerosol generating device 1000 according to an embodiment may include an accommodation portion 260 configured to accommodate at least a portion of the cigarette 300, and the heater 200 configured to heat the cigarette 300. The heater 200 may include a first heating portion 210, a second heating portion 220, and a third heating portion 230.

A heating portion included in the heater 200 may refer to a component configured to heat the cigarette 300 by generating heat. For example, the heating portion included in the heater 200 may be electrically connected to the battery 110 and generate heat to heat the cigarette 300. However, embodiments of the present disclosure are not limited thereto. The heating portion included in the heater 200 may receive heat from another heating portion included in the heater 200 and generate heat to heat the cigarette 300.

The first heating portion 210 may be arranged along the inside of the accommodation portion 260. FIG. 3 shows that the first heating portion 210 is arranged apart from an inner surface of the accommodation portion 260 by a certain distance, but the first heating portion 210 may be arranged to be in contact with the inner surface of the accommodation portion 260.

The first heating portion 210 may be concavely curved toward the third heating portion 230. That is, the first heating portion 210 may be concavely curved toward the third heating portion 230 to surround the third heating portion 230. As the first heating portion 210 is curved, when the cigarette 300 is inserted, an outer surface of the cigarette 300 may be wrapped to efficiently heat the outer surface of the cigarette 300.

The second heating portion 220 may be arranged in a lower portion of the accommodation portion 260. When the cigarette 300 is inserted into the accommodation portion 260, the lower portion of the accommodation portion 260 may refer to a portion of the accommodation portion 260 faced by one end portion of the cigarette 300 inserted into the accommodation portion 260.

The second heating portion 220 may be arranged to be in contact with a lower surface of the accommodation portion 260 as illustrated in FIG. 3, but may be arranged apart from the lower surface of the accommodation portion 260 by a certain distance. Alternatively, the second heating portion 220 may be arranged to cover a certain surface of the lower portion of the accommodation portion 260.

The second heating portion 220 may have a plate shape or a hollow disk shape, but is not limited thereto and may be transformed into various shapes to heat one end portion of a cigarette.

The third heating portion 230 may be arranged to extend in a lengthwise direction of the cigarette 300 from the lower portion of the accommodation portion 260. The third heating portion 230 may also be arranged to extend in the lengthwise direction of the cigarette 300 from a surface of the second heating portion 220.

The third heating portion 230 may be elongate (e.g., rod-shaped, needle-shaped, blade-shaped) or cylindrical, but is not limited thereto and may be transformed into various shapes to heat the inside of the cigarette.

The first heating portion 210, the second heating portion 220, and the third heating portion 230 may be thermally connected to one another. Thermally connected means that heat from one component of the heater 200 may be transferred to other components of the heater 200 through conduction, convection, and radiation.

For example, the first heating portion 210 and the second heating portion 220 may be arranged to be in contact with each other, and the second heating portion 220 and the third heating portion 230 may be arranged to be in contact with each other. In that case, heat between the first heating portion 210, the second heating portion 220, and the third heating portion 230 may be conducted and moved to one another. When heat is transferred through convection or radiation, each component of the heater 200 may be arranged apart from each other by a certain distance.

The aerosol generating device 1000 according to an embodiment may provide the heater 200 capable of simultaneously heating the inside, outside, and one end portion of the cigarette 300.

In the case of an internal-heating-type heater according to a comparative example, since the heater heats the inside of the cigarette 300, heat moves from the inside of the cigarette 300 to the outside of the cigarette 300. Therefore, the inside of the cigarette 300 needs to be heated to a high temperature to transfer heat to the outside of the cigarette 300. Accordingly, the inside of the cigarette 300 may be carbonized by the heater inserted into the cigarette, and there may be a problem in that a preheating time of the heater is prolonged.

On the other hand, in the case of an external-heating-type heater according to another comparative example, since the outside of the cigarette 300 is heated, heat moves from the outside of the cigarette 300 to the inside of the cigarette 300. Therefore, a large area needs to be heated to transfer heat to the inside of the cigarette 300.

In that case, since the area to be heated becomes great, a preheating time of the heater (for example, time to reach a set temperature) may increase at the beginning of an operation of the heater. In addition, there may be a problem in that an amount of aerosol generated at a later time is relatively reduced compared to an amount of aerosol generated at the beginning of the operation of the heater.

At least a portion of the cigarette 300 may be inserted into the accommodation portion 260 of the aerosol generating device 1000. For example, when the cigarette 300 is accommodated in the accommodation portion 260, the third heating portion 230 may be inserted into the cigarette 300. In addition, the first heating portion 210 may surround at least a portion of an outer surface of the cigarette 300, and the second heating portion 220 may be in contact with one end portion of the cigarette 300.

When the heater 200 operates, the first heating portion 210 may heat the outer surface of the cigarette 300, the second heating portion 220 may heat one end portion of the cigarette 300, and the third heating portion 230 may heat the inside of the cigarette 300.

The aerosol generating device 1000 according to an embodiment may heat the cigarette 300 with a uniform temperature distribution by using the components of the heater 200 described above.

The controller 120 of the aerosol generating device 1000 according to an embodiment may heat the first heating portion 210 to a first temperature, the second heating portion 220 to a second temperature lower than or equal to the first temperature, and the third heating portion 230 to a third temperature lower than or equal to the second temperature.

In order to heat the cigarette 300 to a uniform temperature, the heater 200 may be heated such that a temperature at which the first heating portion 210 configured to heat the outer surface of the cigarette 300 is heated is relatively higher than a temperature at which the third heating portion 230 configured to heat the inside of the cigarette 300 is heated.

For example, in a preheating process at the beginning of the operation of the heater 200, the first temperature may be 260° C. to 290° C., the second temperature may be 250° C. to 280° C., and the third temperature may be 240° C. to 270° C. However, embodiments of the present disclosure are not limited thereto. After the heater 200 is preheated, temperatures of the first heating portion 210, the second heating portion 220, and the third heating portion 230 may be maintained at 200° C. to 250° C.

Yet, an optimum heating temperature of the cigarette 300 may vary depending on a type of material constituting the cigarette 300, a composition ratio, and the like.

Materials of the first heating portion 210, the second heating portion 220, and the third heating portion 230 may include ceramics, CNTs, metal materials having thermal conductivity, and the like. The first heating portion 210, the second heating portion 220, and the third heating portion 230 may be manufactured to include the same material. However, embodiments of the present disclosure are not limited thereto. For example, in order to evenly heat the cigarette 300, the first heating portion 210 may include a material having a first thermal conductivity, and the second heating portion 220 may include a material having a second thermal conductivity lower than the first thermal conductivity. In addition, the third heating portion 230 may include a material having a third thermal conductivity lower than the second thermal conductivity.

A length of the first heating portion 210 may be 0.3 times to 1 time a length of the medium portion 310. Flavor provided to a user may vary depending on a ratio between the length of the first heating portion 210 and the length of the medium portion 310. The above-described length refers to the length of the first heating portion 210 in a direction parallel to the lengthwise direction of the cigarette 300.

For example, when the length of the first heating portion 210 is 0.5 times the length of the medium portion 310, the inside, outside, and one end portion of the cigarette 300 may be evenly heated, and at the same time, excellent flavor and an adequate amount of atomization may be provided to the user.

As described above, the aerosol generating device 1000 according to an embodiment may simultaneously heat the inside, outside, and one end portion of the cigarette 300, thereby providing excellent flavor and an adequate amount of atomization to the user. In addition, the heater 200 may not be heated above a required temperature. Therefore, carbonization of the cigarette 300 and off-flavor may be prevented, and power consumption of the battery 110 may be cut.

The same reference numerals for the elements of the embodiment illustrated in FIG. 3 may refer to the same elements hereinafter, and the elements of the embodiment may equally apply to other embodiments.

Figure 4:
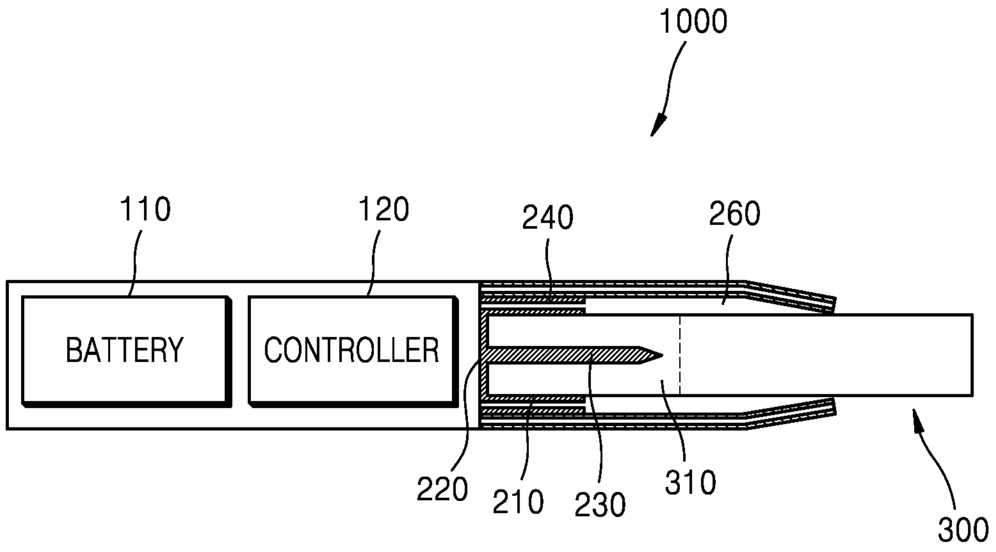
FIG. 4 is a schematic diagram illustrating an example in which a cigarette is inserted into an aerosol generating device, according to another embodiment.

FIG. 4 is a schematic diagram illustrating an example in which a cigarette is inserted into an aerosol generating device, according to another embodiment.

Referring to FIG. 4, the heater 200 of the aerosol generating device 1000 according to another embodiment may further include a fourth heating portion 240. The fourth heating portion 240 may be electrically connected to the battery 110. In addition, the fourth heating portion 240 may be arranged to cover at least a portion of an inner surface of the accommodation portion 260.

Figure 5:
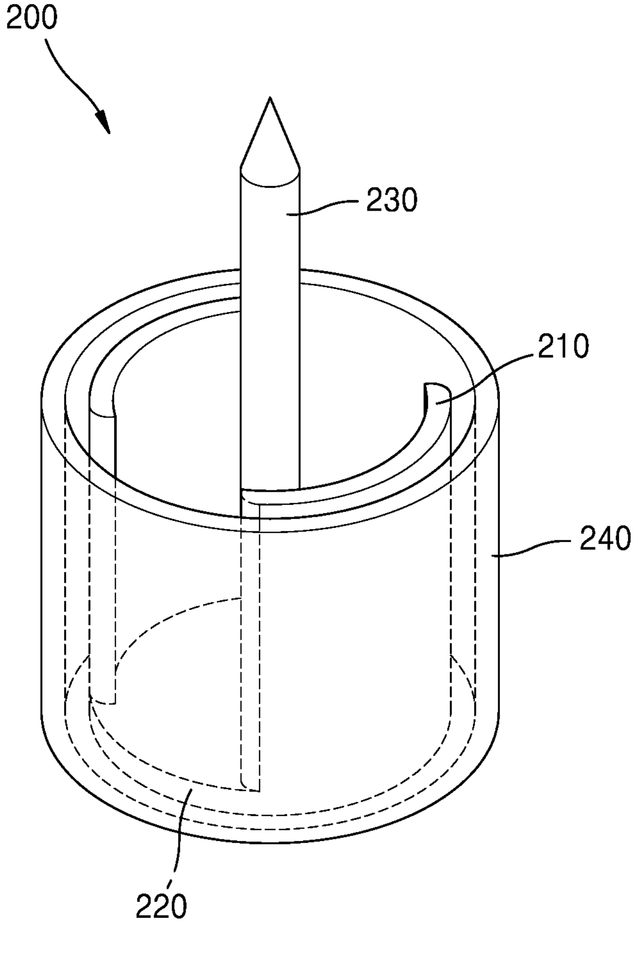
FIG. 5 is a perspective view of a heater of the aerosol generating device illustrated in FIG. 4.

FIG. 5 is perspective view of a heater of the aerosol generating device illustrated in FIG. 4.

Referring to FIG. 5, the fourth heating portion 240 may be thermally connected to the first heating portion 210. The fourth heating portion 240 may be arranged apart from the first heating portion 210 by a certain distance while covering at least a portion of an inner surface of the accommodation portion 260 (FIG. 4).

The fourth heating portion 240 may be manufactured in a film shape having an electrical resistive pattern. Material of the fourth heating portion 240 may include CNTs, ceramics, etc. However, embodiments of the present disclosure are not limited thereto.

A length of the fourth heating portion 240 may be 0.5 times to 1 time a length of the first heating portion 210. The above-described lengths refer to lengths of the first heating portion 210 and the fourth heating portion 240 in a direction parallel to a lengthwise direction of the cigarette 300.

For example, the length of the fourth heating portion 240 may be 1 time the length of the first heating portion 210. That is, when the length of the fourth heating portion 240 is the same as the length of the first heating portion 210, the fourth heating portion 240 may intensively heat only the first heating portion 210.

Figure 6:
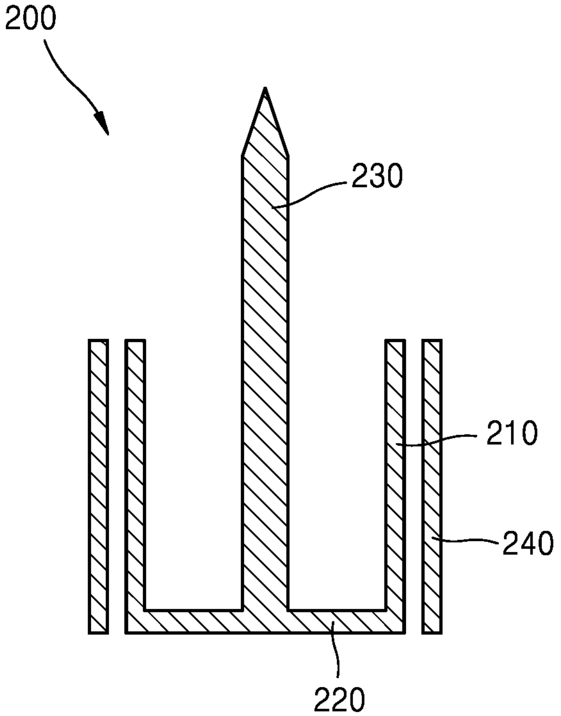
FIG. 6 is a diagram illustrating a cross section of the heater illustrated in FIG. 5.

FIG. 6 is a diagram illustrating a cross section of the heater illustrated in FIG. 5.

Referring to FIG. 6, the first heating portion 210 and the second heating portion 220 may be in contact with each other, and the second heating portion 220 and the third heating portion 230 may be in contact with each other. In that case, heat may be transferred between the first heating portion 210, the second heating portion 220, and the third heating portion 230 in a conductive manner. Therefore, the first heating portion 210, the second heating portion 220, and the third heating portion 230 described above may each serve as a heat conductor for one another.

The fourth heating portion 240 may heat the first heating portion 210. The fourth heating portion 240 may be arranged apart from the first heating portion 210 by a certain distance, so that heat from the fourth heating portion 240 may be transferred to the first heating portion 210 in a convection manner.

The second heating portion 220 may receive heat from the first heating portion 210 to be heated. In addition, the third heating portion 230 may receive heat from the second heating portion 220 to be heated. As a result, heat from the fourth heating portion 240 may be sequentially transferred to the first heating portion 210, the second heating portion 220, and the third heating portion 230 in order.

The aerosol generating device 1000 according to embodiments of the present disclosure may heat the entire heater 200 by heating the fourth heating portion 240 rather than heating the first heating portion 210, the second heating portion 220, and the third heating portion 230 separately, thereby cutting power consumption of the battery 110.

The fourth heating portion 240 may be heated to 270° C. to 300° C. in a process of preheating the heater 200 at the beginning of an operation of the aerosol generating device 1000. After the heater 200 is preheated, a temperature of the fourth heating portion 240 may be maintained at 200° C. to 250° C.

Figure 7:
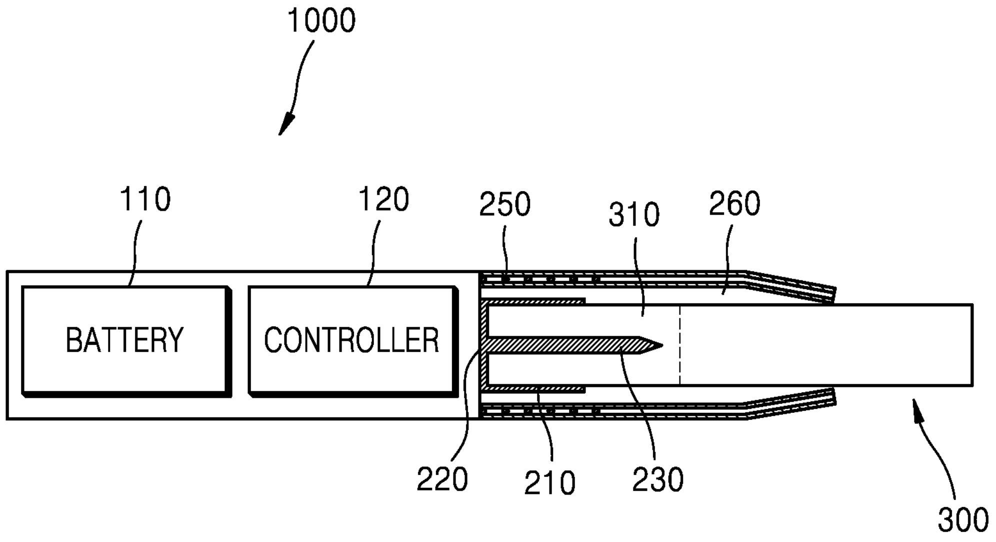
FIG. 7 is a schematic diagram illustrating an example in which a cigarette is inserted into an aerosol generating device, according to another embodiment.

FIG. 7 is a schematic diagram illustrating an example in which a cigarette is inserted into an aerosol generating device, according to another embodiment.

Referring to FIG. 7, the aerosol generating device 1000 may further include an induction coil 250. FIG. 7 illustrates that the induction coil 250 is arranged outside the accommodation portion 260. However, embodiments of the present disclosure are not limited thereto. The induction coil 250 may be arranged within the accommodation portion 260.

The induction coil 250 may be an electrically conductive coil configured to generate an alternating magnetic field by power supplied from the battery 110. The induction coil 250 may be arranged to surround at least a portion of the accommodation portion 260.

When the cigarette 300 is accommodated in the accommodation portion 260 of the aerosol generating device 1000, the aerosol generating device 1000 may supply power to the induction coil 250 such that the induction coil 250 generates an alternating magnetic field.

The first heating portion 210 may include a susceptor configured to be heated by the alternating magnetic field. In that case, the first heating portion 210 may include a material different from that of the second heating portion 220 and the third heating portion 230.

The susceptor of the first heating portion 210 may be heated by the alternating magnetic field generated from the induction coil 250, and may include metal or carbon. For example, the susceptor may include at least one selected from ferrite, ferromagnetic alloy, stainless steel, aluminum, or a combination thereof.

Alternatively, the susceptor 110 may include at least one selected from ceramic such as graphite, molybdenum, silicon carbide, niobium, a nickel alloy, a metal film, zirconia, or the like, a transition metal such as nickel (Ni), cobalt (Co), or the like, a metalloid such as boron (B) or phosphorus (P), or a combination thereof. However, the susceptor is not limited to the above-described examples, and may include anything as long as it is able to be heated to a desired temperature as an alternating magnetic field is applied.

The first heating portion 210 may generate heat by applying the alternating magnetic field generated by the induction coil 250. The second heating portion 220 may receive heat from the first heating portion 210 to be heated. In addition, the third heating portion 230 may receive heat from the second heating portion 220 to be heated. That is, heat from the first heating portion 210 may be sequentially transferred to the second heating portion 220 and the third heating portion 230 in order.

As described above, the aerosol generating device 1000 according to another embodiment may heat the first heating portion 210, which is a susceptor, through the induction coil 250 to heat the remaining second heating portion 220 and the third heating portion, thereby cutting power consumption of the battery 110.

The aerosol generating device 1000 according to another embodiment may further include the induction coil 250 configured to generate an alternating magnetic field, and the first heating portion 210 and the third heating portion 230 may include a susceptor heated by the alternating magnetic field.

The first heating portion 210 and the third heating portion 230 may receive the alternating magnetic field to generate heat. The second heating portion 220 may receive heat from the first heating portion 210 and the third heating portion 230. That is, heat from the first heating portion 210 and the third heating portion 230 may be transferred to the second heating portion 220.

As described above, the aerosol generating device 1000 according to another embodiment may heat the first heating portion 210 and the third heating portion 230, which are susceptors, through the induction coil 250 to heat the second heating portion 220, thereby cutting power consumption of the battery 110 and quickly generating an aerosol at the beginning of the operation of the heater 200.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

The invention claimed is:

1. An aerosol generating device comprising:

an accommodation portion configured to accommodate at least a portion of a cigarette; and a heater arranged in the accommodation portion to heat the cigarette, wherein the heater comprises:

a first heating portion arranged along the inside of the accommodation portion;

a second heating portion arranged in a lower portion of the accommodation portion; and a third heating portion extending in a lengthwise direction of the cigarette from the lower portion of the accommodation portion, and the first heating portion, the second heating portion, and the third heating portion are thermally connected to one another, wherein the first heating portion is heated to a first temperature, and wherein the second heating portion is heated to a second temperature lower than the first temperature.

2. The aerosol generating device of claim 1, wherein the first heating portion and the second heating portion are arranged to be in contact with each other, and the second heating portion and the third heating portion are arranged to be in contact with each other.

3. The aerosol generating device of claim 1, wherein, when the cigarette is inserted into the accommodation portion, the first heating portion surrounds at least a portion of an outer surface of the cigarette to heat the outer surface of the cigarette, the second heating portion contacts one end portion of the cigarette to heat the one end portion of the cigarette, and the third heating portion is inserted into the cigarette to heat the inside of the cigarette.

4. The aerosol generating device of claim 1, wherein the first heating portion is concavely curved toward the third heating portion.

5. The aerosol generating device of claim 1, wherein the third heating portion is heated to a third temperature lower than or equal to the second temperature.

6. The aerosol generating device of claim 1, wherein the first heating portion comprises a material having a first thermal conductivity, the second heating portion comprises a material having a second thermal conductivity lower than the first thermal conductivity, and the third heating portion comprises a material having a third thermal conductivity lower than the second thermal conductivity.

7. The aerosol generating device of claim 1, wherein the cigarette comprises a medium portion comprising an aerosol generating material, and a length of the first heating portion is 0.3 times to 1 time a length of the medium portion.

8. The aerosol generating device of claim 1, wherein the heater further comprises a fourth heating portion arranged in the accommodation portion to be thermally connected to the first heating portion, the first heating portion is heated by the fourth heating portion to transfer heat to the second heating portion, and the second heating portion transfers heat to the third heating portion.

9. The aerosol generating device of claim 8, wherein the fourth heating portion covers at least a portion of an inner surface of the accommodation portion and is arranged apart from the first heating portion by a certain distance.

10. The aerosol generating device of claim 8, wherein a length of the fourth heating portion is 0.5 times to 1 time the length of the first heating portion.

11. The aerosol generating device of claim 1, further comprising an induction coil arranged outside the accommodation portion to generate an alternating magnetic field, wherein the first heating portion receives the alternating magnetic field to generate heat, the second heating portion receives heat from the first heating portion, and the third heating portion receives heat from the second heating portion.

12. The aerosol generating device of claim 1, further comprising an induction coil arranged outside the accommodation portion to generate an alternating magnetic field, wherein the first heating portion and the third heating portion receive the alternating magnetic field to generate heat, and the second heating portion receives heat from the first heating portion and the third heating portion.

13. The aerosol generating device of claim 1, wherein a base of the third heating portion is a plane of the second heating portion.

* * * * *